(12) United States Patent
Nicholson et al.

(10) Patent No.: US 12,096,111 B2
(45) Date of Patent: Sep. 17, 2024

(54) PARTIAL FACE DETECTION FOR VIDEO CONFERENCING

(71) Applicant: Lenovo (Singapore) Pte. Ltd., Singapore (SG)

(72) Inventors: John W. Nicholson, Cary, NC (US); Daryl C. Cromer, Raleigh, NC (US); Howard Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 120 days.

(21) Appl. No.: 17/698,461

(22) Filed: Mar. 18, 2022

(65) Prior Publication Data
US 2023/0300454 A1 Sep. 21, 2023

(51) Int. Cl.
*H04N 23/60* (2023.01)
*G06V 10/774* (2022.01)
*G06V 10/82* (2022.01)
*G06V 20/70* (2022.01)
*G06V 40/16* (2022.01)
*H04L 65/403* (2022.01)

(52) U.S. Cl.
CPC ......... *H04N 23/64* (2023.01); *G06V 10/7747* (2022.01); *G06V 10/82* (2022.01); *G06V 20/70* (2022.01); *G06V 40/16* (2022.01); *H04L 65/403* (2013.01)

(58) Field of Classification Search
CPC ...... G06V 10/744; G06V 40/16; G06V 20/70; G06V 10/82; G06V 10/774; H04L 65/403; H04N 7/147; H04N 7/15; H04N 23/60

USPC ........................................... 348/14.01–14.16
See application file for complete search history.

(56) References Cited

U.S. PATENT DOCUMENTS

| 10,025,950 | B1* | 7/2018 | Avasarala | G06F 18/23213 |
| 10,628,931 | B1* | 4/2020 | Ramos | G06T 5/50 |
| 11,165,992 | B1* | 11/2021 | Ong | G06V 10/82 |
| 2019/0370529 | A1* | 12/2019 | Kumar | G06T 7/74 |
| 2021/0405865 | A1* | 12/2021 | Faulkner | H04N 7/147 |

OTHER PUBLICATIONS

"Image Classification on ImageNet", retrieved on Feb. 21, 2022 from https://paperswithcode.com/sota/image-classification-on-imagenet.

* cited by examiner

*Primary Examiner* — Yosef K Laekemariam
(74) *Attorney, Agent, or Firm* — John M. Rogitz; John L. Rogitz

(57) ABSTRACT

In one aspect, a device may include at least one processor and storage accessible to the at least one processor. The storage may include instructions executable by the at least one processor to provide at least a first image to a model as input, where the model may have been trained using groups of training images that show respective different parts of faces of one or more people but not full faces of the one or more people. The instructions may also be executable to receive, as output from the model, an indication regarding a facial body part. Based on the indication, the instructions may be executable to present a notification during a video conference, where the notification may indicate at least one action to take for a full face to be shown in a video stream as part of the video conference.

16 Claims, 6 Drawing Sheets

PARTIAL FACE DETECTION FOR VIDEO CONFERENCING

FIELD

The disclosure below relates to technically inventive, non-routine solutions that are necessarily rooted in computer technology and that produce concrete technical improvements. In particular, the disclosure below relates to techniques for partial face detection for video conferencing.

BACKGROUND

As recognized herein, video conferences present a unique set of issues that do not necessarily arise with in-person conferences. As further recognized herein, among these issues is that often a user's face is not adequately shown in their camera stream since the camera might be offset from the user or from a separate display that the user is using to view other video conference participants. This can lead to other participants missing certain physical mannerisms and emotional conveyance that the user might be exhibiting while speaking. As also recognized herein, particularly in the context of laptop computers, the laptop lid is often not angled correctly to adequately capture the user's face. There are currently no adequate solutions to the foregoing computer-related, technological problems.

SUMMARY

Accordingly, in one aspect a device includes at least one processor and storage accessible to the at least one processor. The storage includes instructions executable by the at least one processor to, during deployment of a model, provide at least a first image to the model as input to the model. The model is trained using groups of training images that show respective different parts of faces of one or more people but not full faces of the one or more people. The instructions are also executable to receive, as output from the model, an indication of a facial body part shown in the first image. Based on the indication, the instructions are executable to present a notification to a participant of a video conference, where the notification indicates at least one action for the participant to take for the participant's full face to be shown in a video stream as part of the video conference.

In some examples, the instructions may be executable to train the model using the groups of training images that show respective different parts of faces of the one or more people but not full faces of the one or more people. The training images may be labeled with respective facial body parts shown in the respective training images. Additionally, in some examples the instructions may be executable to train the model using at least one group of training images that show ceilings but no facial body parts, to train the model using at least one group of training images that show keyboards but no facial body parts, and/or to train the model using at least one group of training images that show desk tops and/or table tops but no facial body parts.

In some example implementations, the notification may indicate an adjustment that the participant is to make to a camera for the participant's full face to be shown in the video stream as part of the video conference. If desired, the device may even include the camera.

Also in some example implementations, the notification may indicate a body posture adjustment that the participant is to make for the participant's full face to be shown in the video stream as part of the video conference. Additionally or alternatively, the notification may indicate a body positioning adjustment that the participant is to make for the participant's full face to be shown in the video stream as part of the video conference.

In various example embodiments, the model may include one or more artificial neural networks.

In another aspect, a method includes providing at least a first image to a model as input, where the model is trained using groups of training images that show respective different parts of faces of one or more people but not full faces of the one or more people. The method also includes receiving, as output from the model, an indication regarding a facial body part. Based on the indication, the method includes presenting a notification to a participant of a video conference. The notification indicates at least one action for the participant to take for the participant's full face to be shown in a video stream as part of the video conference.

So, for example, the indication may indicate that no facial body part is shown in the first image. Additionally or alternatively, the indication may indicate that a full face is not shown in the first image, but if desired the indication may still indicate at least one facial body part that is shown in the first image.

Still further, in some examples the method may also include training the model using the groups of training images that show respective different parts of faces of the one or more people but not full faces of the one or more people. The training images may be labeled with respective facial body parts shown in the respective training images.

Additionally, in some example implementations the notification may indicate an adjustment that the participant is to make to a camera for the participant's full face to be shown in the video stream as part of the video conference.

In still another aspect, at least one computer readable storage medium (CRSM) that is not a transitory signal includes instructions executable by at least one processor to provide at least a first image to a model as input, where the model is trained using groups of training images that show respective different parts of faces of one or more people but not full faces of the one or more people. The instructions are also executable to receive, as output from the model, an indication regarding a facial body part. Based on the indication, the instructions are executable to present a notification during a video conference, where the notification indicates at least one action to take for a full face to be shown in a video stream as part of the video conference.

In some example implementations, the instructions may be executable to identify first and second participants of the video conference, where the first and second participants may both use a same device to participate in the video conference. In these implementations, the instructions may also be executable to present the notification, where the notification may indicate at least one action to take for full faces of both the first and second participants to be shown in the video stream as part of the video conference.

The details of present principles, both as to their structure and operation, can best be understood in reference to the accompanying drawings, in which like reference numerals refer to like parts, and in which:

DETAILED DESCRIPTION

Figure 1:
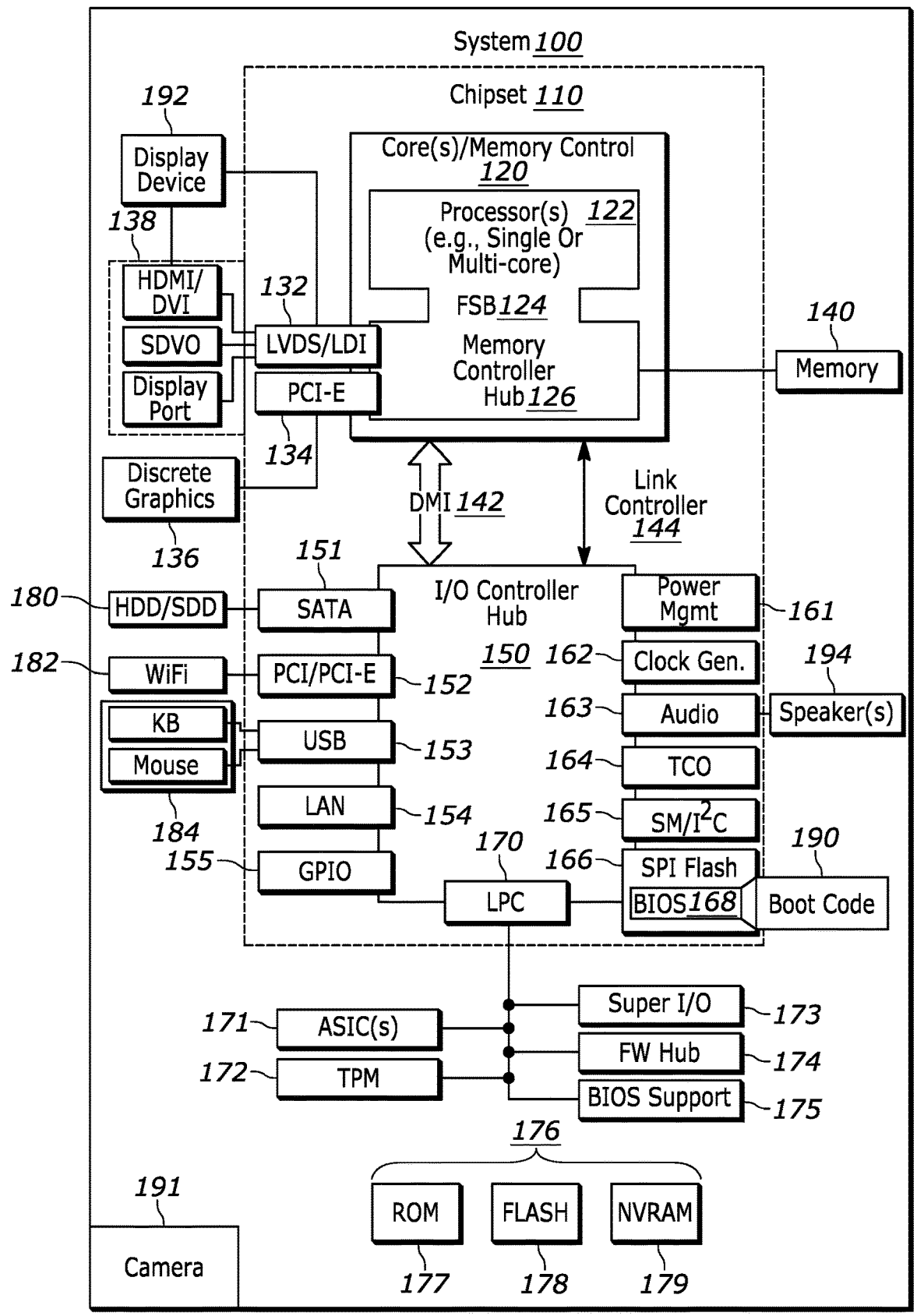
FIG. 1 is a block diagram of an example system consistent with present principles.

Among other things, the detailed description below deals with using cameras integrated into notebooks/laptop computers as well as cameras on other devices for video conferencing. So, for example, if a participant's face is not adequately shown in their camera stream, a notification may be presented to the participant to tilt their notebook lid to a certain angle to correctly capture the participant's entire face, and the notification may even instruct the user to sit a certain distance from the notebook.

Thus, one or a series of models/classifiers may be used to detect if an entire face is present within a video capture stream, or if merely parts of a face/body are shown. To determine whether the entire face is present, a device may therefore look/extract the full list of facial features including eyes, nose, mouth, cheeks, chin, forehead, and ears. If any of the items establishing a full face are missing, the device may notify the user to reposition the notebook lid (or external camera) so the integrated camera can fully capture the face. For example, a "forehead" detector component may be used to recognize that the top half of a head is present, but none of the other parts of the face are found in the stream, and then based on this the device may present a notification such as to "tilt the screen down" or "sit up straight" or "I can't see your face" or "scoot back". Or as another example, if the participant has initially been framed with their full face by their notebook camera and the user subsequently moves the notebook panels with respect to each other (resulting in part of the participant's face no longer being framed), the notification might be to "tilt the lid back" or "move the hinge back".

However, further note that present principles are not limited to notebooks and that other device types and cameras may be used. For example, stand-alone cameras may be used and if parts of a participant's face are missing the device may notify the participant to reposition the external, stand-alone camera.

What's more, the classifier(s) may also be trained to recognize scenes where no participant is shown at all, such as to recognize ceilings, C covers of laptops, desks, etc.

Additionally, the device may even autonomously control a camera that has variable (physical) zoom/rotation/positioning so that the device can detect which part of the face is missing and then autonomously realign the camera to capture the full face. For example, if a forehead is missing the device may re-aim camera to a more upwards field of view.

Data about the physical position of the device may also be considered. For example, on a notebook, the device may use the known angle of the lid (e.g., as sensed via a proximity sensor or potentiometer or accelerometer) as an input to the classifier(s). E.g., a relatively large angle may be correlated as more likely to have a forehead, and less likely to have a chin, and so the device may determine the angle and provide a particular notification to the participant based on that. For example, if the angle is big, the device may notify the participant to tilt the lid down. As another example, if the angle is acceptable (e.g., ninety degrees relative to a surface on which the notebook rests, plus/minus ten degrees) but the full face is still not shown, the device may provide a notification for the participant to physically move back a greater distance from the device itself so the device can capture their full face.

Also note that in some examples, a device operating consistent with present principles may provide notifications if the model/classifier as trained also recognizes other parts of the user's body beyond the face as missing but that might be desired to be in frame. Those body parts may include neck, chest/shirt, etc. Thus, the classifier may also be trained with images showing and not showing those features (e.g., but still not showing a full face).

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C # or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include a camera 191 that gathers one or more images and provides the images and related input to the processor 122. The camera 191 may be digital camera or webcam, but may also be a thermal imaging camera, an infrared (IR) camera, a three-dimensional (3D) camera, and/or a camera otherwise integrated into the system 100 and controllable by the processor 122 to gather still images and/or video.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone.

Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
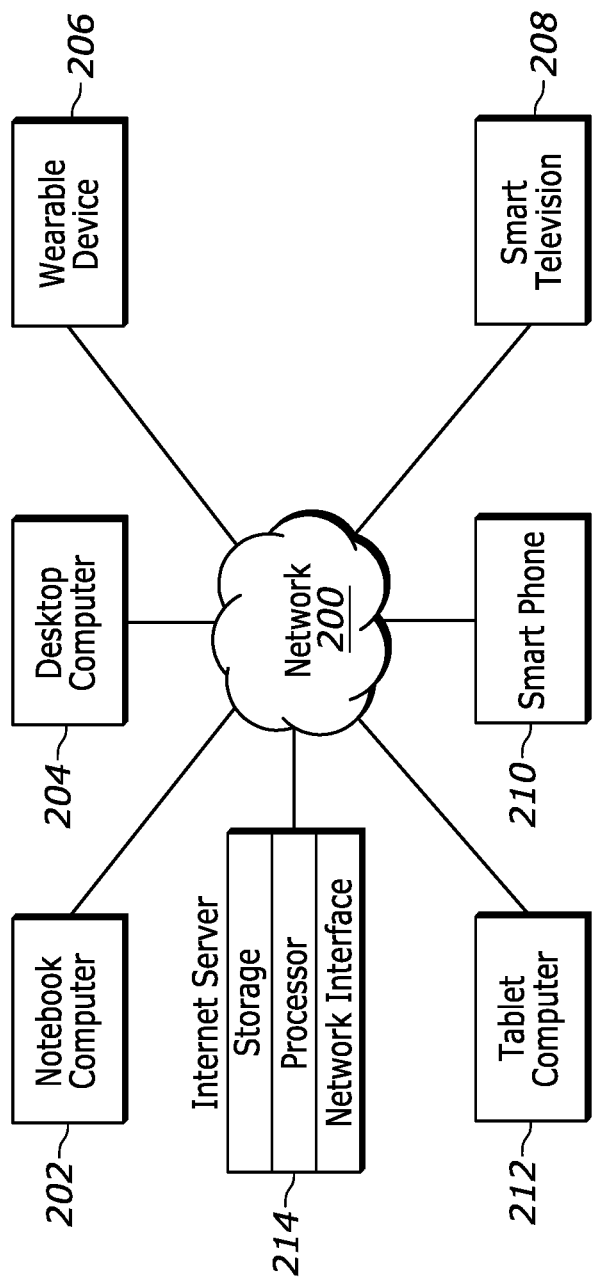
FIG. 2 is a block diagram of an example network of devices consistent with present principles.

Turning now to FIG. 2, example devices are shown communicating over a network 200 such as the Internet in accordance with present principles (e.g., for exchanging audio/video feeds as part of video conferencing). It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
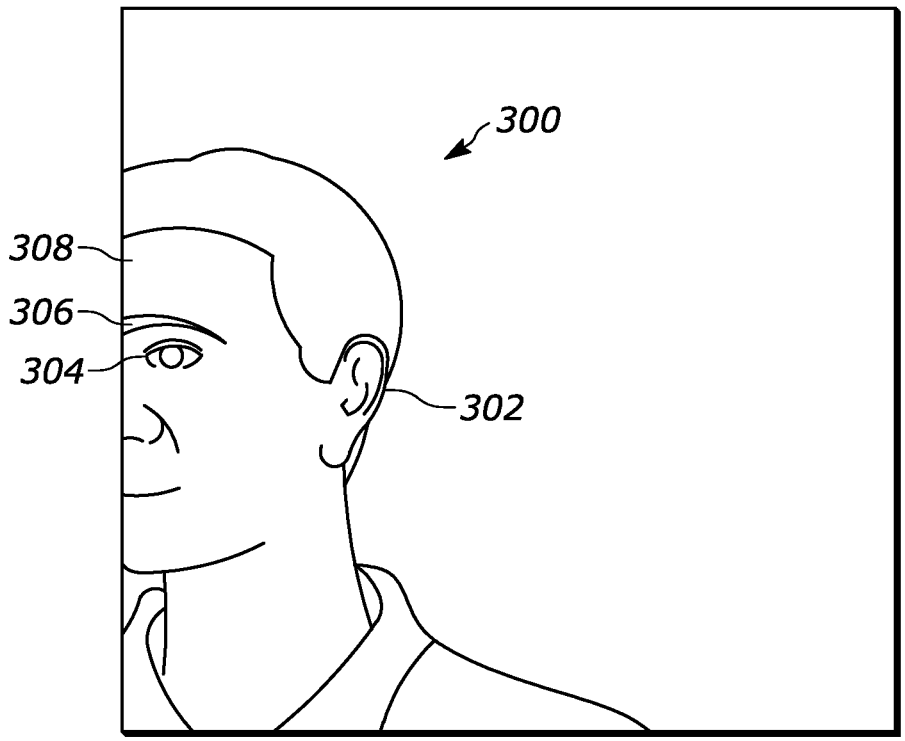
FIG. 3 illustrates an example video stream of a video conference participant that merely shows part of the participant's face consistent with present principles.

Now in reference to FIG. 3, suppose a first participant 300 is video conferencing with a second participant or even more than one additional participant. A local camera communicating with a local client device being used by the participant 300 (a desktop computer in this example) may be streaming video of the participant 300 to the client devices of the other participants as part of the video conference. Also assume the camera is a stand-alone camera that is spaced from the local client device according to this example, and that the stand-alone camera communicates wirelessly with the local client device via Bluetooth or other wireless communication. Further assume the participant 300 is currently viewing the display of their desktop computer.

As may be appreciated from FIG. 3, based on the stand-alone camera's current positioning and field of view, and based on the current positioning of the participant 300 themselves while the participant 300 looks at the display of their desktop computer, the camera only captures video of left portions of the participant's face, including a left ear 302, left eye 304, left eye brow 306, and left portion 308 of the participant's forehead. This may be problematic for the other video conference participants as the other participants may not be able to use the lip movement of participant 300 to help them understand what the participant 300 is saying, and they might also be unable to adequately discern facial gestures conveying emotions that may also give the other participants greater understanding and context for the content being conveyed by the participant 300.

Thus, consistent with present principles, an artificial intelligence (AI) model or other model executing locally at the client device of the participant 300 (and/or executing at a remotely-located coordinating server that is facilitating the video conference) may detect that only part of the face of the participant 300 is shown in the video stream that is being provided as part of the video conference and then provide an output indicating as much. Responsive to the output, the client device may then present a notification like the example graphical user interface (GUI) 400 shown in FIG. 4.

Figure 4:
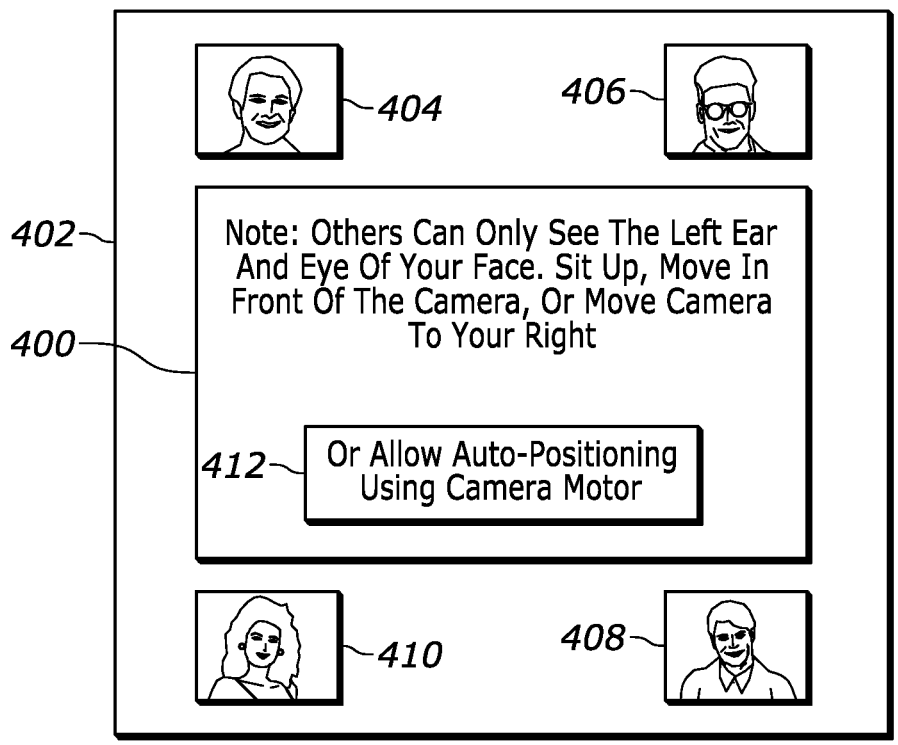
FIG. 4 shows an example notification that may be presented to the participant based on part but not all of the participant's face being shown in the video stream consistent with present principles.

As shown in FIG. 4, the GUI 400 may be overlaid on a larger video conference GUI 402 that might show respective video streams 404-410 of remotely-located video conference participants. Or in other example implementations, the GUI 400 may replace another GUI showing the video streams 404-410. But in either case, as may also be appreciated from FIG. 4, the GUI 400 may include text indicating that other participants can only see the left ear and eye of the participant 300. The GUI 400 may also include text indicating one or more adjustments the participant 300 is to make for the participant's camera to capture the full face of the participant 300 for transmission as a video stream to the other video conference participants.

For example, as shown in FIG. 4, the GUI 400 may indicate an adjustment that the participant is to make to the camera itself, such as moving the camera across real space to a different physical position to capture more of the participant's face (to the right of its current positioning in this case, relative to the participant 300 themselves). Additionally or alternatively, though not shown, the GUI 400 might indicate other adjustments to make to the camera, such as to angle the camera differently (e.g., whether kept at the same location or not), or to control a zoom level and/or focal length of the camera to zoom out to show more of the participant's face. Or in the case of a laptop computer, the GUI 400 might indicate that the laptop's top panel or lid (on which the camera might be located along with the laptop's display) should be tilted up or down about the laptop's hinge to thus move the camera itself and capture more of the participant's face.

As may also be appreciated from FIG. 4, indications of one or more adjustments the participant 300 is to make for the participant's camera to capture the full face (or at least more of the face) may also include indications of a body posture adjustment that the participant 300 is to make for the participant's full face to be shown in the video stream as part of the video conference. In the present example, this may include instructing the participant 300 to sit up, which might be provided responsive to the camera being used for the video stream or another local camera in communication with the participant's client device executing posture recognition and/or computer vision to recognize a slouched posture angled to the right.

In some specific examples, for enhanced device accuracy in the applicability of a given indication, the instruction to sit up might only be provided in combination with the client device also already detecting an initial posture position through camera input (e.g., at the beginning of the conference) that results in more of the participant's face being shown in the camera's field of view, and/or detecting that currently only a left portion of the participant's face is being shown and that sitting upright rather than slouched to the right may help bring more of the participant's face into the camera's field of view. Otherwise, according to these specific examples the notification may simply indicate that the camera itself should be repositioned.

As may be further appreciated from FIG. 4, indications of one or more adjustments the participant 300 is to make for the participant's camera to capture the full face (or at least more of the face) may also include indications of a body positioning adjustment that the participant 300 is to make beyond adjusting body posture for the participant's full face to thus be shown in the video stream. In the present example, this may include instructing the participant 300 to move themselves across real space for their face to be more directly in front of the camera and/or within the camera's field of view, which might be provided responsive to the camera being used for the video stream or another local camera in communication with the participant's client device executing computer vision to recognize a direction in which the participant 300 is to move and/or a location to which the participant 300 is to move. Also note that while the GUI 400 merely indicates that the participant 300 should move their face in front of the camera in this example, more specific indications may be provided based on execution of computer vision and/or object recognition, such as an indication to move near another object fully shown within the camera's field of view or to move to another specific room location within the camera's field of view.

Additionally, in some specific examples, for enhanced device accuracy in the applicability of a given indication, the instruction to make a body positioning adjustment may only be provided in combination with the client device also already detecting an initial body position through camera input (e.g., at the beginning of the conference) that results in more of the participant's face being shown in the camera's field of view, and/or detecting that currently only a left portion of the participant's face is shown and that adjusting body position may help bring more of the participant's face into the camera's field of view. Otherwise, according to these specific examples the notification may simply indicate that the camera itself should be repositioned.

Further note consistent with present principles that while the indication(s) discussed above may be presented in text as shown on the GUI 400, the text of the indications may additionally or alternatively be read aloud using a digital assistant or other computerized voice, with the voice being presented via a local speaker connected to the client device of the participant 300. Furthermore, in some specific examples, such as for a smartphone, head-mounted display device, or other wearable device like a wearable smartwatch, haptic notifications may also be provided to draw the participant's attention to the fact that something related to their video may need adjustment in order to more fully show the participant's face to others.

Still in reference to FIG. 4, also note that the GUI 400 may include a selector 412. The selector 412 may be selectable to command the client device to allow or enable the client device itself to autonomously position the camera at another location to better show the participant's full face. The device may do so using a motor to move the camera, as will be explained more below in relation to other figures such as FIG. 8. But here, further note that the camera may additionally or alternatively rotate, change its viewing axis, and/or change its angle or lens orientation to better capture the participant's face (e.g., while staying at the same location). This may also be done using a motor in the camera/camera module.

Figure 5:
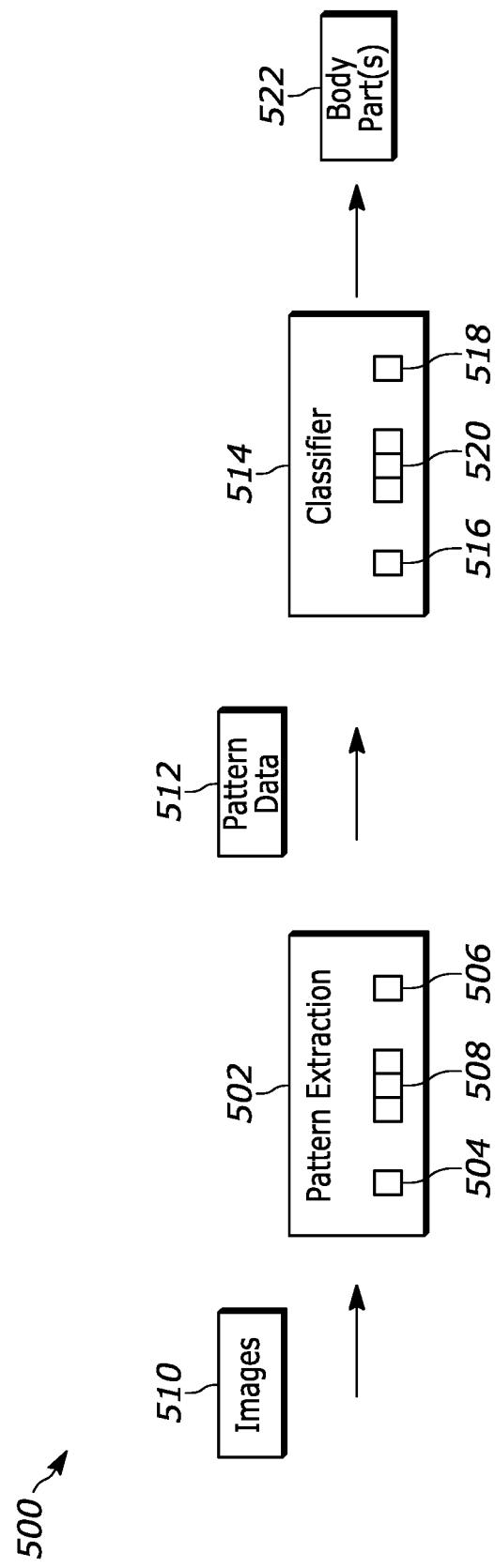
FIG. 5 illustrates example artificial intelligence (AI) model architecture consistent with present principles.

Continuing the detailed description in reference to FIG. 5, it is to be understood that an AI model may be adopted and trained consistent with present principles to make inferences that identify particular facial body parts of partial faces that are shown in one or more images provided to the AI model as input. The base model may be, for example, Inception V3 or a Haar Cascade, and the model once trained may be stored and deployed at a server or even an end user's own client device in any appropriate combination.

Thus, example architecture of an example AI model 500 that may be used consistent with present principles is shown in FIG. 5. The model 500 may include a pattern extraction module 502 that may be established by one or more artificial neural networks (NNs), such as one or more feed forward NNs or convolutional NNs. Each of the NNs of the module 502 may have an input layer 504, output layer 506, and multiple hidden layers 508 in between such as Softmax layers, ReLU layers, and batch normalization layers. During execution/deployment, the module 502 may receive as input images 510 generated by a camera for a video conference that is currently ongoing or that is scheduled to occur within a threshold time in the future (e.g., within five minutes).

The module 502 may then process the image data 510 through its layers and provide as output 512 pattern data that it has inferred from the input 510, where the pattern data may be related to facial features shown in the input 510. The output 512 may in turn be provided to a classifier module 514 that may itself include one or more NNs that each also have an input layer 516, output layer 518, and multiple hidden layers 520 in between such as Softmax layers, ReLU layers, and batch normalization layers. The module 514 may thus process the output 512 from the module 502 as input to its own input layer 516 and use one or more classification algorithms to then provide as output 522 classification of one or more facial body parts as inferred from the data 512. The device executing the model 500 may then use the output 522 to provide one or more notifications consistent with present principles.

For example, the device may access a local or remote relational database that correlates particular notifications to provide with one or more respective facial body part(s) that are identified from a given image or set of images to thus identify a particular notification to provide in a given instance based on whatever particular facial body part or combination of body parts are identified by the model 500 in that instance. The database may be preconfigured by a developer or system administrator, for example. Also note that other processes may also be executed in combination with use of the database, such as identifying an initial body posture and/or position as already set forth above to determine a notification to provide.

Still in reference to the model 500, note that the model 500 may be trained and tested prior to deployment or even after deployment for further refinement. In either case, during training, images or groups of images showing different respective facial body parts (and/or combinations of facial body parts) but not full faces may be labeled according to the facial body parts they actually show and may then be provided as training input to the model 500 for processing. Training may be performed using one or more machine learning algorithms, including one or more deep learning algorithms. Training may include supervised training, semi-supervised training, and/or unsupervised training. Reinforcement learning and dimensionality reduction might also be used in certain examples.

As for the NNs themselves that are to be trained, they may initially include random weightings/functions for the respective nodes of their respective layers and then undergo extensive training to render desired outputs (e.g., by adjusting the weights/functions). Additionally or alternatively, one or more nodes of the layers for each NN may be preconfigured by a developer to infer a given output, which may then be further refined through additional machine learning/training if desired.

Also note for training that in various examples, different groups of labeled training images may be used that show not just one or more specific facial body parts for each group (e.g., respective groups of images of left ears, chins, right eyes, etc.) but also groups that do in fact show full faces and/or groups that show no facial components at all. For the groups of images that show no faces, one group may include images of, for example, building ceilings but no facial body parts (e.g., for cases where the camera is angled up too much relative to the user's face as might occur with a laptop computer or stand-alone camera). Image groups showing keyboards, desks or desk tops specifically, and/or tables or table tops specifically (e.g., but still no facial body parts) may also be used for training (e.g., for cases where the camera is angled down too much relative to the user's face as might also occur with a laptop computer or stand-alone camera). Other example image groups may include a group showing non-facial body parts such as shoulders, arms, chest, and neck (with or without facial body parts also being shown), a group showing chairs (e.g., but no facial body parts), and/or groups showing other types of furniture such as bookcases and shelves (e.g., but still no facial body parts).

Figure 6:
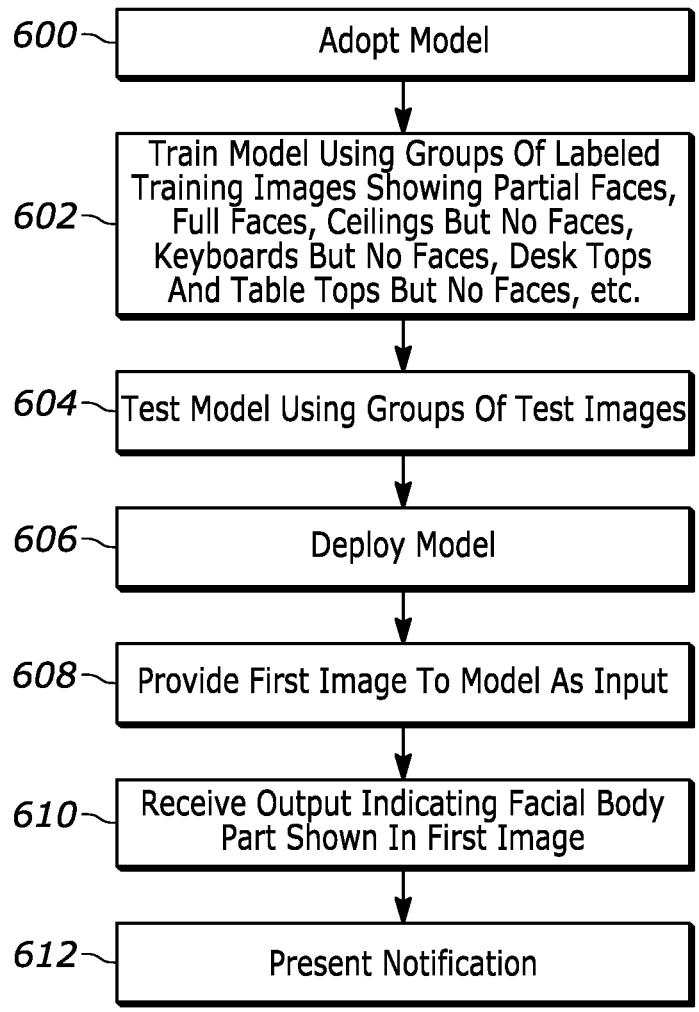
FIG. 6 illustrates example logic in example flow chart format that may be executed by a device consistent with present principles.

Now referring to FIG. 6, it shows example overall logic consistent with present principles that may be executed by one or more devices such as the system 100, a client device, and a remotely-located server in any appropriate combination. Note that while the logic of FIG. 6 is shown in flow chart format, other suitable logic may also be used.

Beginning at block 600, a model may be adopted, e.g., based on input from a developer or system admin indicating a particular model to be adopted, such as Inception V3 or a Haar Cascade. The logic may then proceed to block 602 where the device may train the model using groups of labeled training images as described above (e.g., groups that show and are labeled with different respective parts of faces of one or more people but not full faces of the one or more people, groups that show and are labeled with ceilings, groups that show and are labeled with keyboards and other office and desk-type objects, etc.).

From block 602 the logic may then proceed to block 604 where the model as trained may be tested using groups of test images showing various respective facial body parts, ceilings, desk tops, etc. Assuming adequate training as determined from the testing, the logic may thereafter move to block 606 where the model may be deployed for one or more video conferences consistent with present principles. Thus, at block 608 and during a given video conference, the device may provide at least a first image of a conference participant to the model as input to then, at block 610, receive an output from the model. The output may indicate a particular facial body part(s) shown in the first image (but that a full face is not shown in the first image), that no facial body part is shown in the first image, that a keyboard but no facial body part is shown in the first image, etc. Then at block 612, based on the output received at block 610, the logic may present one or more notifications indicating at least one action for the relevant participant to take for the participant's full face to be shown in a video stream as part of the video conference as described herein.

Figure 7:
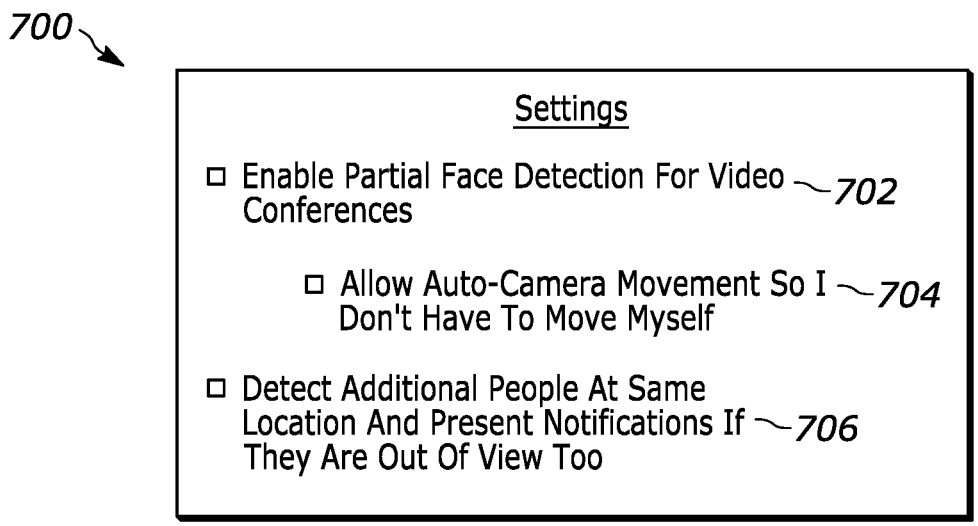
FIG. 7 shows an example graphical user interface (GUI) that may be used to configure one or more settings of a device to operate consistent with present principles.

Continuing the detailed description in reference to FIG. 7, it shows an example settings graphical user interface (GUI) 700 that may be presented on a display to configure one or more settings of a device to operate consistent with present principles. For example, the GUI 700 may be presented on a client device display that might be undertaking the logic of FIG. 6 and other functions described above, though the GUI 700 may also be presented on a display of a system administrator's device or other device as well (such as the display for a coordinating server).

The settings GUI 700 may be presented to set or enable one or more settings of the device to operate consistent with present principles. The GUI 700 may be reached by navigating a main settings menu of the device or its operating system, or navigating a menu of a dedicated video conferencing application. Also note that in the example shown, each option or sub-option discussed below may be selected by directing touch, cursor, or other input to the respective check box adjacent to the respective option.

As shown in FIG. 7, the GUI 700 may include an option 702 that may be selectable a single time to set or enable the device, system, software, etc. to undertake present principles for multiple future video conferences, such as executing the functions described above in reference to FIGS. 3 and 4 and executing the deployment part of the logic of FIG. 6.

The GUI 700 may also include a sub-option 704 that may be selectable to set or enable the device to perform autonomous camera movement to more-fully capture a video conference participant's face consistent with present principles (e.g., in addition to or in lieu of providing notifications as described above).

If desired, the GUI 700 may also include an option 706 that may be selectable to set or enable the device to, during video conferencing, also detect additional people that might be present at the same location as another participant and present notifications if both (or all) participants who happen to be at a same location and are using a same client device for the conference do not have their full faces shown in the relevant video stream.

Accordingly, note here that in situations where two or more participants are using the same client device to video conference with other remote participants, and one or more of the local participant faces are slightly out-of-frame, a notification instructing the out-of-frame participant to move the camera or reposition themselves or take other action may be provided. Assuming that the participant complies, full faces of each the participants may thus be shown in the video stream as part of the video conference.

However, further note that in some examples the client device may also determine based on GPS coordinates or other location-tracking methods that the device is currently located in a public place. To reduce false positives in presenting notifications for the framing of people that are not actually participants of the video conference, based on determining a public location, eye tracking may then be performed to identify user engagement with the conference content presented on the device's display to then present notifications only for users determined to be engaged. In some specific examples, the device may be required to determine user engagement for a sufficient threshold amount of time to filter out glances and brief looks by non-participants (e.g., more than ten seconds). As another example involving user engagement, user engagement may be determined based on execution of natural language understanding (NLU) to determine that a given person is discussing a topic that is the subject of the video conference or its pre-published agenda to thus determine that the person's face should be shown in the camera stream and present notifications accordingly.

Additionally or alternatively but also to also reduce false positives in two-participant scenarios where both participants are using the same device, the client device may require a threshold percentage of total facial area to be shown in an image or stream for a notification to then be presented regarding the framing of that person. For example, if less than a quarter of an estimated total facial area is shown, a notification may not be provided, whereas if more than a quarter of the estimated total facial area is shown (but still not the full face), a notification may be provided.

Additionally, though not shown in FIG. 7, note that in some examples the GUI 700 may further include an option that may be selectable to set or enable the device to detect that a participant's face is out of frame and send that person a chat message or email that the person should adjust their position to fully capture their face.

Figure 8:
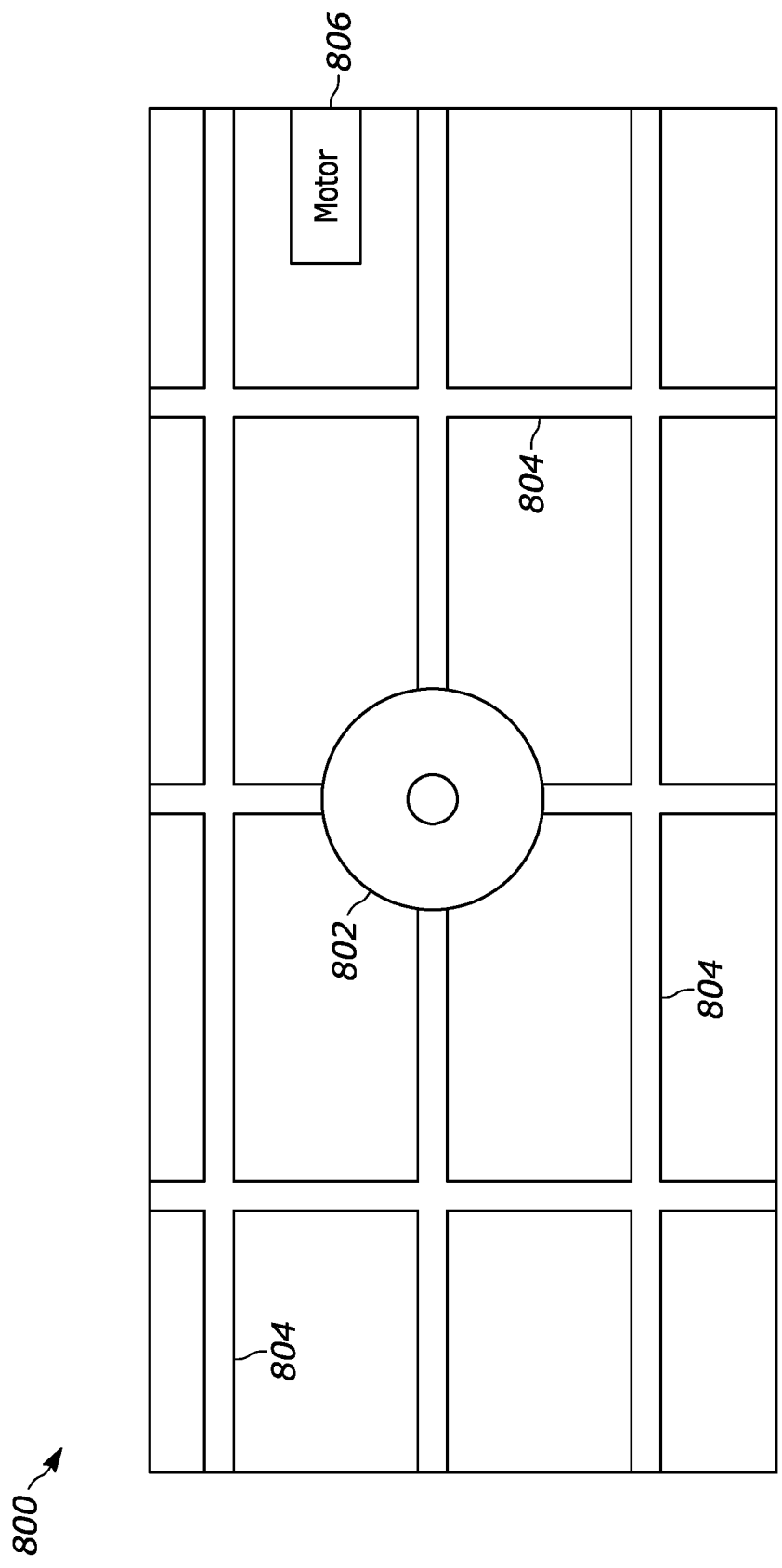
FIG. 8 shows a schematic diagram of an example camera module that may be used consistent with present principles.

Moving on to FIG. 8, it shows a schematic diagram of an example multi-track camera module 800 that may be used for capturing video of one or more local participants for video conferencing consistent with present principles. Note that the module 800 may be integrated into the housing of a client device such as a laptop computer, desktop computer, smartphone, etc.

As shown in FIG. 8, the module 800 may include a camera 802 and may use linkages to move the camera 802 along one or more horizontal and vertical tracks 804 under control of a motor 806, though diagonal tracks may also be included in some examples. Thus, the associated client device may control movement of the camera 802 to reposition the camera 802 within the module 800, thereby adjusting its field of view to stream a full face capture of a video conference participant(s) rather than merely a partial face.

Further note consistent with present principles that in some examples, the camera module 800 may also be configured to, using the motor 806 or another motor, rotate the camera's lens/field of view left to right and right to left, as well as rotate/angle the camera's lens/field of view up and down to better capture and stream a full face capture. USB and stand-alone cameras in particular may be suited for this, though other cameras may incorporate these types of movement as well.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor; and
   storage accessible to the at least one processor and comprising instructions executable by the at least one processor to:
   during deployment of a model, provide at least a first image to the model as input to the model, the model trained using groups of training images that show respective different parts of faces of one or more people but not full faces of the one or more people;
   receive, as output from the model, an indication of a facial body part shown in the first image; and
   based on the indication, present a notification to a participant of a video conference, the notification indicating at least one action for the participant to take for the participant's full face to be shown in a video stream as part of the video conference;

wherein the instructions are executable to:
train the model using the groups of training images that show respective different parts of faces of the one or more people but not full faces of the one or more people, wherein the model is trained using at least one group of training images that show: ceilings but no facial body parts, keyboards but no facial body parts, desk tops but no facial body parts, and/or table tops but no facial body parts;
wherein the notification is also presented based on input from a sensor other than a camera;
wherein the input from the sensor indicates a laptop lid angle, the notification indicating an adjustment to make to the laptop lid angle.

2. The device of claim 1, wherein the instructions are executable to:
train the model using at least one group of training images that show ceilings but no facial body parts.

3. The device of claim 1, wherein the instructions are executable to:
train the model using at least one group of training images that show keyboards but no facial body parts.

4. The device of claim 1, wherein the instructions are executable to:
train the model using at least one group of training images that show one or more of: desk tops but no facial body parts, table tops but no facial body parts.

5. A method, comprising:
providing at least a first image to a model as first input, the model trained using groups of training images that show respective different parts of faces of one or more people but not full faces of the one or more people;
receiving, as output from the model, an indication regarding a facial body part; and
based on the indication and based on second input from a sensor other than a camera, presenting a notification to a participant of a video conference, the notification indicating at least one action for the participant to take for the participant's full face to be shown in a video stream as part of the video conference;
wherein the second input from the sensor indicates a laptop lid angle, the notification indicating an adjustment to make to the laptop lid angle.

6. At least one computer readable storage medium (CRSM) that is not a transitory signal, the at least one computer readable storage medium comprising instructions executable by at least one processor to:
provide at least a first image to a model as first input, the model trained using groups of training images that show respective different parts of faces of one or more people but not full faces of the one or more people;
receive, as output from the model, an indication regarding a facial body part; and
based on the indication and based on second input from a sensor other than a camera, present a notification during a video conference, the notification indicating at least one action to take for a full face to be shown in a video stream as part of the video conference;
wherein the second input from the sensor indicates a laptop lid angle, the notification indicating an adjustment to make to the laptop lid angle.

7. The at least one CRSM of claim 6, wherein the second input from the sensor indicates a device location at a public place, the notification being presented based at least in part on the device location at the public place.

8. The at least one CRSM of claim 7, wherein the instructions are executable to:
based on the device location at the public place, execute eye tracking to identify an engaged user; and
based on the identification of the engaged user, present the notification indicating at least one action for the engaged user to take.

9. The at least one CRSM of claim 8, wherein the identification of the engaged user is executed based on identification of user engagement for at least a threshold amount of time.

10. The at least one CRSM of claim 6, wherein the sensor is a global positioning system (GPS) sensor.

11. The at least one CRSM of claim 6, wherein the sensor is a microphone, and wherein the instructions are executable to:
execute natural language understanding (NLU) using input from the microphone to determine that a first user is discussing a topic associated with the video conference; and
based on the determination, present the notification, the notification indicating at least one action for the first user to take.

12. The device of claim 1, wherein the input from the sensor indicates a device location at a public place, the notification being presented based at least in part on the device location at the public place.

13. The device of claim 1, wherein the input from the sensor indicates the participant as speaking about a topic associated with the video conference, and wherein the notification is presented based on identification of the participant as speaking about the topic.

14. The method of claim 5, wherein the sensor comprises a potentiometer.

15. The method of claim 5, wherein the sensor comprises a proximity sensor.

16. The method of claim 5, wherein the sensor comprises an accelerometer.

* * * * *